March 17, 1953 M. CAMRAS 2,632,059

MAGNETIC RECORDER

Filed May 30, 1945

Inventor
MARVIN CAMRAS by The Firm of Charles W. Hills Attys.

Patented Mar. 17, 1953 2,632,059

UNITED STATES PATENT OFFICE 2,632,059

MAGNETIC RECORDER

Marvin Camras, Chicago, Ill., assignor to Armour Research Foundation of Illinois Institute of Technology, a corporation of Illinois Application May 30, 1945, Serial No. 596,777

10 Claims. (Cl. 179—100.2)

The present invention relates generally to a magnetic recording and reproducing device and more specifically to a winding mechanism for effecting level winding of a paramagnetic wire onto a spool in such device.

A common method of level winding of a paramagnetic wire in a magnetic recording and reproducing device is to slowly reciprocate a wire guide or level winding device longitudinally with respect to the spool onto which the wire is being wound so as to effect closely adjoining turns of wires to form a compact spool of a plurality of layers. However, the addition of such level winding device adds to the complication of the recording mechanism.

An object of the present invention is to eliminate the usual level winding device in a magnetic recording and reproducing device, and at the same time retain the level winding function thereof.

A more specific object of the present invention is to provide relative reciprocating movement between a recording (or reproducing) head and a spool as the wire is being wound onto the spool in a magnetic recording and reproducing device so as to eliminate the necessity of adding a level winding device for correctly guiding the wire to form closely adjoining turns and a compact multiple-layered spool.

Other objects and advantages will become apparent from the following description taken in conjunction with the accompanying drawings, wherein.

Figures 1, 2, 3, 4:
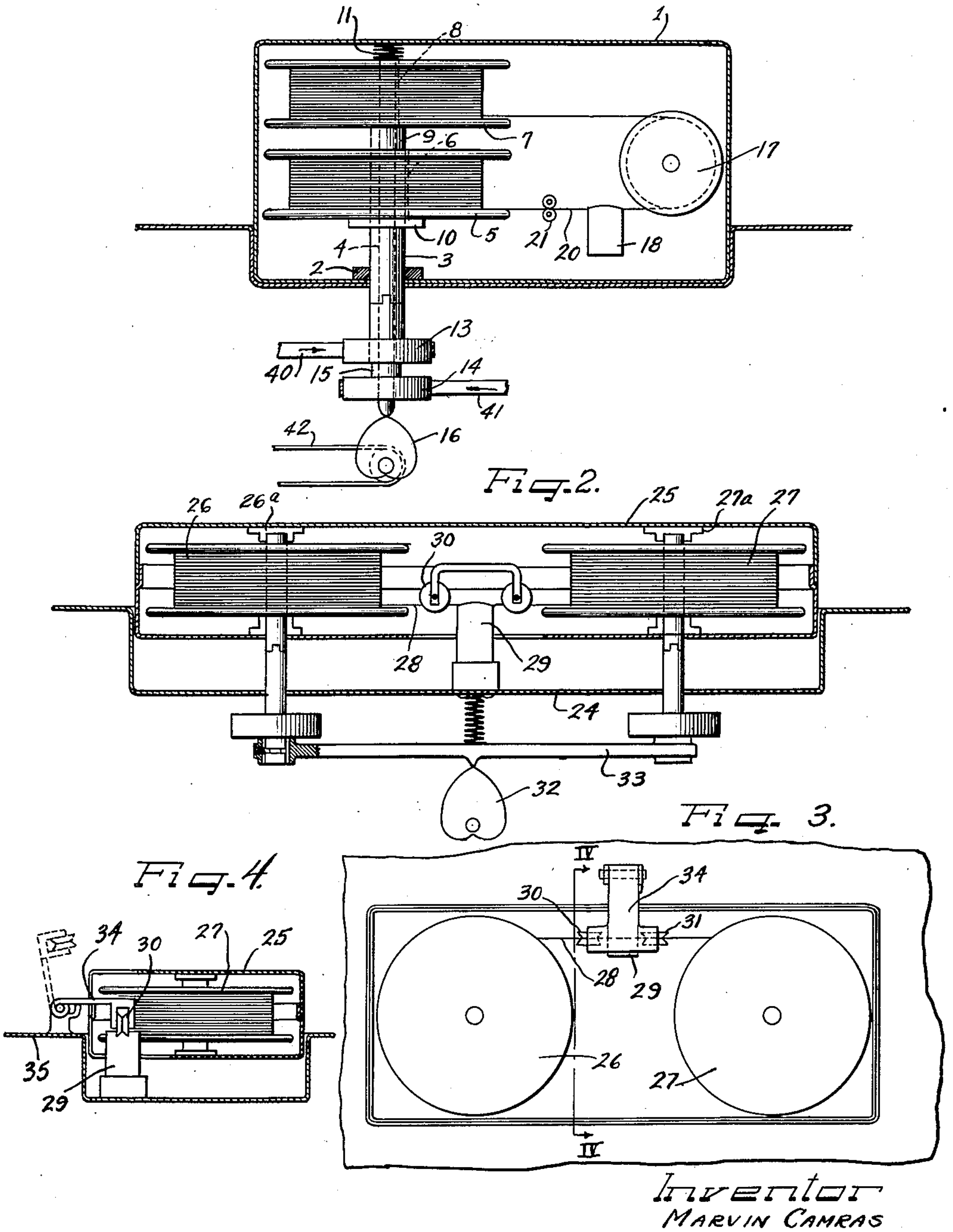
Figure 1 is a side view of a magazine in a magnetic wire recorder and reproducer including a winding mechanism involving the principles of the present invention.
Figure 2 is a side view of a modification of the device shown in Figure 1.
Figure 3 is a top view of the structure shown in Figure 2.
Figure 4 is a view taken along the line IV—IV of Figure 3.

Referring particularly to Figure 1, numeral 1 denotes a magazine having fixed thereto a bearing 2 having journaled therein a sleeve 3 which sleeve is in telescoping relationship with a shaft 4. A spool 5 is rigidly secured to sleeve 3 by means of a key 6 whereas a spool 7 is rigidly secured to shaft 4 by means of a key 8. A collar 9, which separates spools 5 and 7, is also rigidly secured to shaft 4. Similarly, a collar 10 is rigidly secured to sleeve 3 and acts to abut or support spool 5 against axial movement in a downward direction as illustrated. A helical spring 11 has one end in abutting relationship with the interior wall of magazine 1 and the other in abutting relationship with the top surface of spool 7 as illustrated. A driving wheel 13 is mechanically coupled to sleeve 3 and a driving wheel 14 is mechanically coupled to the shaft 4. Wheels 13 and 14 are driven in opposite directions by any suitable driving means, such as drive belts 40 and 41. Wheels 13 and 14 are separated by a washer or ball bearing 15.

Spring 11 biases the entire assembly, including spools 5 and 7, the respective drive shafts 3 and 4, and drive wheels 13 and 14, in a downward direction, as illustrated, against the surface of a rotating heart-shaped cam 16. Suitable means, such as a drive belt 42 engaging a hub 43 of the cam 16, is provided for rotating the heart-shaped cam 16 for effecting vertical reciprocating movements of the entire assembly located thereabove substantially in a direction at right angles to the path of the wire against the biasing action of the spring 11, as indicated by arrows. It should be noted that the entire assembly shown in Figure 1 may be arranged sideways or in other than the vertical as illustrated.

Rotatably mounted to magazine 1 is an idler pulley 17 with its axis at right angles to the axis of spools 5 and 7. An electromagnetic recording and reproducing head 18 of any well known type is provided comprising an electromagnet, generally of horse-shoe shape, with confronting narrowly tapered poles having a groove at the surface thereof for accommodating a longitudinally moving wire 20 of paramagnetic material whose surface is thereby incrementally magnetized by a magnetic coil (not shown) associated with the recording head 18. The specific details of the recording head form no part of the present invention and the structure thereof is shown and described in more detail in my Patent No. 2,351,006, entitled "Magnetic Recording Head," issued June 13, 1944.

Wire 20 is generally of small diameter, in the neighborhood of .005 inch; that is, substantially the thickness of a human hair; consequently several miles of such wire can be wound onto a spool such as spool 5. A pair of guide rolls 21 is rigidly secured to magazine 1 adjacent the recording head so as to guide wire 20 as it passes through the recording head. It will be seen, therefore, that the recording head 18 and guide rolls 21 are rigidly secured with respect to magazine 1, whereas the spools 5 and 7 are longitudinally reciprocated in the magazine. Consequently wire 20 may be unwound from spool 7 and wound onto spool 5 and the successive turns of wire wound on spool 5 may be closely disposed and a plurality of layers formed by virtue of the slow reciprocating motion of the entire spool assembly resulting from rotation from the heart-shaped cam 16 or other equivalent reciprocating mechanism.

Stated differently, the wire, as it is being unwound from one spool onto the other, has a substantially stationary path, whereas the spools 5 and 7 are slowly reciprocated in an axial direction for the purpose of applying successive layers onto spool 5, each layer having closely spaced or adjoining turns, so as to form a compact spool.

Figure 2 shows a modification of the structure shown in Figure 1, wherein a magazine 25 is provided having rotatably mounted therein, by bearings 26*a* and 27*a*, respectively, a pair of spools 26 and 27 having their axes in parallel relationship. A wire 28 is unwound from spool 26 onto spool 27. A recording head 29, as well as the guide rolls 30 and 31, is rigidly secured to a supporting member 24 independently of magazine 25. A heart-shaped cam 32 is rotated against the lower outer surface of a spring biased cross bar 33, the ends of which serve as bearings for the shafts rigidly secured to spools 26 and 27 extending through the magazine 25, as illustrated, for the purpose of reciprocating the entire magazine including the rotatably mounted spools 26 and 27, with respect to the fixed recording head 29, in an axial direction with respect to the spools, as indicated by arrows. Hence, wire 28 is effectively unwound from spool 26 and wound onto spool 27 (or vice-versa) and the reciprocating motion imparted to the magazine 25 will effect level winding of the wire onto the spool so as to provide closely adjoining turns of wires and compact layers, leaving no void spaces in the wound spool.

Figure 4 shows a pivoted fork-like member 34 which is provided for supporting both of the guide rolls 30 and 31 (see Figure 2). Such fork-like member 34 is pivotally mounted on a supporting structure 35 which is independent of the magazine 25; preferably, the same supporting structure as that of the recording head 29. Member 34 rests on top of wire 28 as it extends from one spool to the other, and the weight of the fork-like member 34 aids in maintaining wire 28 in a fixed path as it traverses the recording head 29.

As the term "wire" is used throughout this case, it is intended to mean any thread-like member.

It will, of course, be understood that various details of construction may be varied through a wide range without departing from the principle of this invention, and it is therefore not the purpose to limit the patent granted herein otherwise than necessitated by the scope of the appended claims.

I claim as my invention:

1. A magnetic recording or reproducing device including a pair of rotatably mounted spools, a stationary electromagnetic head, an elongated magnetic record member, and means for reciprocating said pair of spools simultaneously in the same axial direction as said record member is being unwound from one and wound onto the other of said spools to effect level winding of the record member.

2. A magnetic recording or reproducing device including a pair of axially disposed, rotatably mounted spools, a length of magnetizable wire which is to be simultaneously unwound from one of said spools and wound onto the other, a magnetic head through which said wire passes during the winding operation, and means simultaneously reciprocating said spools in the same axial direction to effect level winding of said wire.

3. A magnetic recording or reproducing device including a supporting structure having a pair of co-axially disposed spools rotatably mounted thereon, an idler pulley also rotatably mounted on said structure with its axis at right angles to the axis of said spools, an electromagnetic head rigidly secured with respect to said structure, a length of magnetizable wire which is disposed so as to be unwound from one of said spools, entrain a portion of the perimeter of said idler pulley, extend through said head and finally become wound on said other spool, and means for rotating said pair of spools in opposite directions and for reciprocating said pair of spools in an axial direction and relative to said head to effect level winding of said wire onto one spool from the other.

4. A magnetic recording or reproducing device including a supporting structure, a pair of spools disposed in close, co-axial relationship and rotatably mounted on said structure, a pair of telescoping drive shafts, each rigidly secured to one of said spools, an idler pulley mounted on said structure with its axis at right angles to the axis of said pulleys, a fixed electromagnetic head, a length of magnetizable wire adapted to be unwound from one spool, entrain over said idler pulley, extend through said head and become wound onto said other pulley, means for rotating said spools in opposite directions, and for simultaneously reciprocating said spools in an axial direction, and spring means having one end abutting against said structure for biasing said spools in an axial direction.

5. A magnetic recording or reproducing device including a movable frame, a pair of spools rotatably mounted on said frame with their axes in parallel relaitonship, a magnetic head mounted in fixed position on said device and disposed centrally of said spools and through which a length of magnetizable wire is passed as it is unwound from one spool onto the other, and means for reciprocating said frame together with said spools in a direction axially of said spools to effect level winding of said wire.

6. A magnetic recording or reproducing device including a magazine, a pair of spools rotatably mounted in said magazine with their axes in parallel relationship, an electromagnetic head together with closely spaced guide means disposed between said spools and through which a magnetizable wire extends as it is unwound from one of said spools onto the other, means externally of said magazine for rigidly mounting said head and guide means, and means for rotating said pair of spools and for simultaneously axially reciprocating both of said spools with respect to said head to effect level winding of said wire.

7. A magnetic recording or reproducing device including a magazine, a pair of spools rotatably mounted in said magazine with their axes in parallel relationship, an electromagnetic head together with closely spaced guide means disposed between said spools and through which a magnetizable wire extends as it is unwound from one of said spools onto the other, means externally of said magazine for rigidly mounting said head and guide means, and means for rotating said pair of spools and for simultaneously axially reciprocating both of said spools to effect level winding of said wire, said guide means comprising a fork-like member pivotally mounted independently of said magazine adjacent one side of said head and being adapted to rest on said wire.

8. A magazine for a magnetic recording device including a pair of coaxially disposed spools rotatably mounted in said magazine for winding a magnetizable recording medium onto one of said spools from the other, a magnetic recording head mounted in said magazine and through which said medium passes as it moves from one spool to the other, and means for axially reciprocating said spools while said magazine and recording head remain stationary for effecting level winding of said medium.

9. In magnetic recording apparatus including a frame, a pair of concentric shafts mounted for reciprocatory motion within said frame, a spool mounted on each of said shafts, means rigidly supported by said frame and through which a recording member is passed as it is wound onto one spool from the other, and means for jointly reciprocating said shafts while said rigidly supported means and frame remain stationary to effect level winding of said medium.

10. A cartridge for use in a unit adapted for magnetic recording and reproduction comprising: a frame member; means for supporting an electromagnetic recording medium within said frame member; said last-named means including a pair of coaxially rotating members, displaced along a single axis, for supporting said medium; an electromagnetic recording head supported within said frame member; movable means for guiding said recording medium from one of its supporting members along a path adjacent said head and uniformly distributing said medium axially along the length of another of said supporting members; and means attached to said supporting members and adapted upon insertion of said cartridge in said unit to engage driving means in said unit, whereby either of said supporting members may be positively driven by said driving means to thereby urge said medium along said path.

MARVIN CAMRAS.

REFERENCES CITED

The following references are of record in the file of this patent:

UNITED STATES PATENTS

| Number | Name | Date |
|---|---|---|
| 1,513,403 | Lebeis | Oct. 28, 1924 |
| 1,886,856 | Warwick | Nov. 8, 1932 |
| 2,213,631 | Heller et al. | Sept. 3, 1940 |
| 2,477,146 | Scherbatskoy | July 26, 1944 |

FOREIGN PATENTS

| Number | Country | Date |
|---|---|---|
| 329,804 | Germany | Nov. 29, 1920 |
| 363,751 | Germany | Nov. 13, 1922 |